Dec. 16, 1969 E. M. NOEL 3,483,813
MUFFIN GRILL APPARATUS
Filed May 27, 1968 2 Sheets-Sheet 2
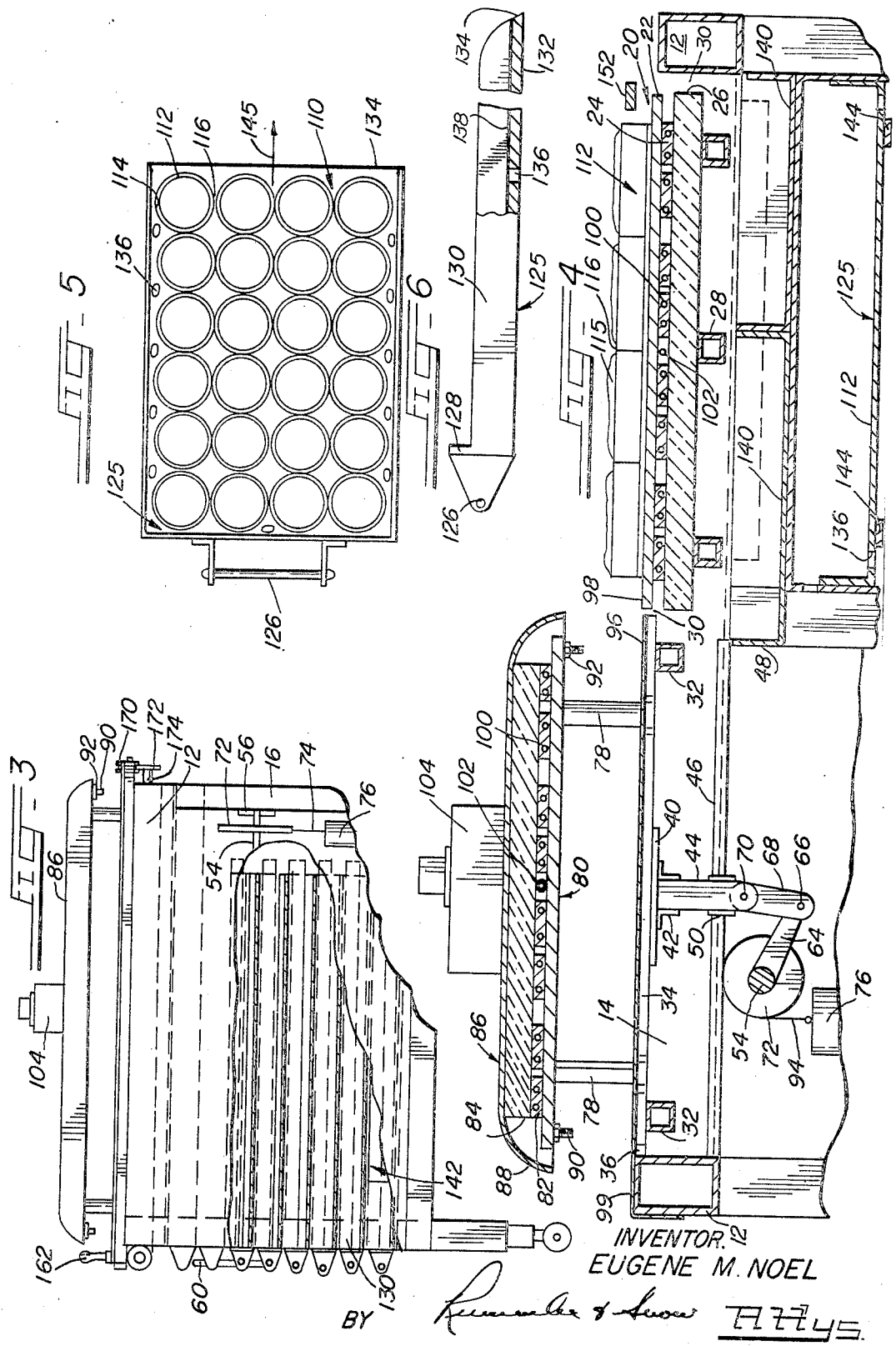
INVENTOR.
EUGENE M. NOEL United States Patent Office 3,483,813
Patented Dec. 16, 1969

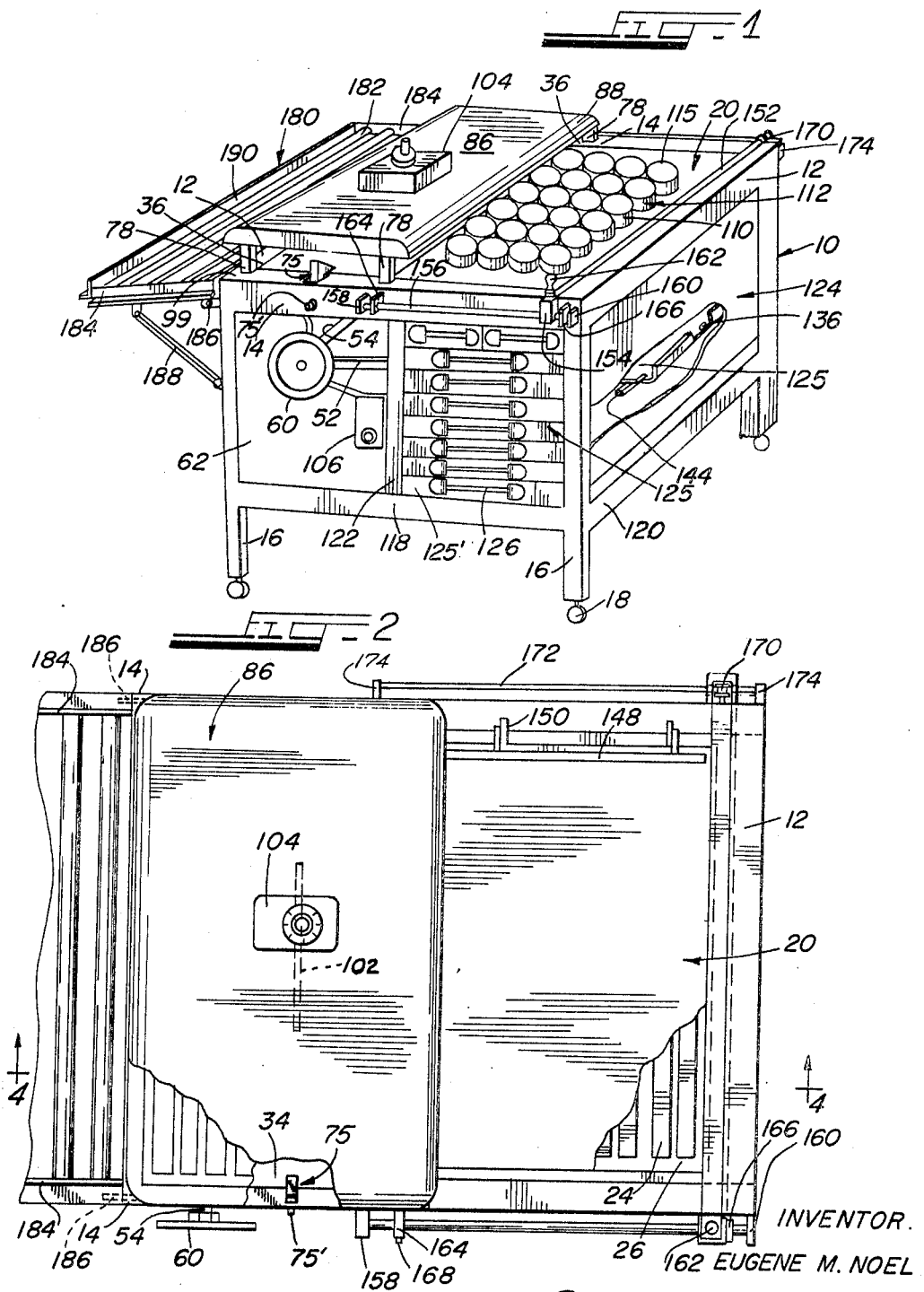

3,483,813
MUFFIN GRILL APPARATUS
Eugene M. Noel, 80 Elmwood St.,
Somerville, Mass. 02144
Filed May 27, 1968, Ser. No. 732,176
Int. Cl. A47j 37/06, 37/10
U.S. Cl. 99—355    11 Claims

ABSTRACT OF THE DISCLOSURE

The disclosure describes a unified dough composition proofer and grill for the preparation of English muffins and the like, including a cabinet for humidifying and proofing portions of the dough composition on convenient flat trays with pre-formed balls of muffin dough retained thereon within an assembly of rings, a first open-faced grill for grilling the dough portions on one side while same are within the ring assembly and a second grill for grilling the dough portions on the other side while on a reciprocatable counter-balanced table top holder, with a manually operated slide bar to move the ring assembly from the open-faced grill to a position registering with the other grill and means for vertically raising and lowering the reciprocatable table top. In one embodiment the grill provides in a single unit a humidification and dough-proofing cabinet located conveniently under one grill, to receive muffin dough ball holders each comprising a unitary assembly of rings, joined side to side and carried upon a tray receivable in one of severable compartments of the cabinet the ring assembly containing the dough balls being adapted to be easily removed from the tray by simply positioning the tray on the grill, against suitable guide means and then, while holding the ring assembly, pulling the tray from beneath the ring assembly to deposit the assembly onto the grill surface. Other embodiments are disclosed.

BACKGROUND OF THE INVENTION

The art of preparing muffins and the like, requires the formation and retention of the muffin in the form of a ball for processing, followed by carefully controlled proofing of the dough under humid conditions and lastly toasting the dough balls so as to properly cook the dough and form a brown crust therein having the desired appearance and consistency. To accomplish these purposes on a commercial scale, huge humidifying and proofing cabinets are employed wherein the balls of muffin dough, for example, are treated to a flowing stream of warm humid air to cause the proofing of the dough. Secret formulas for the dough are used and after mixing of the ingredients to the desired consistency, the dough is divided into balls and placed in muffin tins for proofing. Hundreds of dozens of such balls in the pockets of the muffin pans are processed simultaneously in room size proofing zones which are carefully controlled as to temperature and humidity. Generally, the proofing cycle for English muffins is about 30 minutes in the presence of air having a humidity of at least about 90% and at a temperature of about 120–140° F. During this treatment the dough rises and forms minute pockets of carbon dioxide throughout the dough ball. The purpose of the close control of the proofing is to promote the formation of uniformly sized and evenly spaced bubbles or pockets within the dough by even release of the carbon dioxide. The baking or grilling completes the process and here again, close control of time and temperature are paramount. Generally, these steps involve the placement, removal and transportation of the muffin trays from one side of a room to the other with consequent high labor costs and occasionally poor product quality control.

In the laboratory testing of dough formulas, as well as in small or low-demand restaurants, it is highly desirable that the baker be able to carry out these various steps with facility, using apparatus which is compact, easily cleaned and easily operated. Furthermore, it is advantageous that the baker be able to control and process varying amounts of muffins to meet fluctuations in demand, as in a restaurant or to meet the processing requirements for small batches of dough of different formulae, as in a bakery laboratory.

It is a primary object of this invention to provide a small, compact muffin proofing and toasting machine which has a capacity of from one muffin to about two dozen muffins each five minute cycle of operation to meet the needs of bakers laboratories and low-demand restaurants. Another object of this invention is to provide a hand-operated dough proofing and muffin toasting machine of variable capacity, wherein the process steps are easily carried out in sequence with a minimum of lost motion and maximum efficiency and control. Still another object is to provide in a dough proofing and muffin toasting machine, a series of trays adapted to fit within a dough proofing cabinet, the top of which has horizontal grill plates laterally off-set from one another, whereby the trays are withdrawn from the proofing oven in a position to be raised and placed on the first grill plate with a minimum of motion; and to provide means to slide the partially grilled muffins, in their holder, from the first grill plate onto a table located under a second grill plate to be brought subsequently into contact with the second grill plate by a counter-balanced elevating mechanism.

SUMMARY OF THE INVENTION

The present invention concerns a combined muffin dough proofing and grilling apparatus wherein a plurality of dough balls, each confined within an individual one of an integrated assembly of coplanar muffin forming rings, are initially carried on a tray adapted to be housed in one part of the apparatus for proofing of the dough, then transferred onto the upper surface of an adjacent first grill member by merely sliding the tray from beneath the ring assembly to deposit the assembly onto the said grill member for grilling the bottom side of the dough. The dough balls are then shifted to a position on the surface of a horizontal plate disposed below a second grill member for grilling the upper side of the dough, the forming ring assembly with the dough balls being slidably transferred from one grilling position to the other by means of a manually operated pusher bar slidable across the first grill member, the upper side of the dough being engaged with the surface of the second grill member by relative movement of the said plate and the second grill member, one toward the other.

DESCRIPTION OF THE DRAWINGS

A specific embodiment of this invention is illustrated in the drawings, wherein:

FIG. 1 is a perspective view of the device of this invention with the parts broken away to show the operating parts and the tray guides;

FIG. 2 is a top plan view with parts of the grills cut to show the heating elements and the latch mechanism;

FIG. 3 is a fragmentary end view of the device of this invention with parts cut away to show the counterweight and tray arrangement;

FIG. 4 is a cross-sectional view taken along the lines 4—4 of FIG. 2;

FIG. 5 is a top plan view of the tray with a ring holder therein; and

FIG. 6 is a side view of a tray partly cut-away to show the details thereof.

THE PREFERRED EMBODIMENT

Referring to the drawings, the various figures show a preferred embodiment of the invention in the form of a muffin toaster adapted to process up to about 24 dozen muffins per hour which may be used in a bakery laboratory or in a medium sized restaurant. In FIG. 1, the device is shown to provide a table 10 formed of longitudinal side frame members 12 (see also FIG. 4) and end members 14, forming a rectangular support which is affixed to the leg members 16 having casters 18. The leg members are adjustable for leveling the table on the floor. The casters 18 can also be of the type which can be locked in a non-rolling position when desired to stabilize the table on the floor.

The table 10 supports a first grill plate 20 which comprises a flat rectangular metal sheet 2 resting upon and in contact with a plurality of heating elements (strip heaters) 24 (FIGS. 2 and 4) which are supported upon the lower plate 26 of Transite insulation and carried by the longitudinal spaced support bars 28, affixed between to the end frame members 14. The grill plate 20 is a standard grill unit adapted to be positioned within the side frame and end frame members with a space 30 therearound so that the entire assembly can be easily removed for cleaning and also to periodically clean the top interior of the table and other internal support members.

The table 10 has a second series of spaced support bars 32 (FIG. 4) affixed between the end frame members 14 upon which the table top 34 is supported in its lowered position. The outer edge of the table top 34 is spaced from the grill plate 20, as at the space 30 and also at the other sides adjacent the side members 12 and 14 as indicated at the spaces 36 (FIG. 4). On the underside of the table top 34 and substantially at the geometric center is a reinforcing base plate 40, affixed thereto and carrying base member 42 into which is seated the shaft 44.

The cut-a-way view in FIG. 1 shows a front cross brace 52 which carries the front end of the elongated shaft 54 in a rotational relationship, similar to the support collar 56 (FIG. 3) and a hand wheel 60 is affixed to the shaft 54 on the outside of the front trim panel 62. The shaft 54 carries at its midpoint the crank arm 64, for rotation therewith, which is connected at its extended end by means of the pin 66 to the link 68. The link 68 in turn is connected to the lower end of the shaft 44, by means of the wrist pin 70. Near the back wall of the cabinet the shaft 54 has the sheave 72 affixed thereto around which extends the cable 74 carrying the counterweight 76 on the free end. The other end of the cable, which need only make about one turn around the sheave, is attached to the sheave in a known manner, not illustrated. The counterweight 76 tends to rotate the sheave 72 and the shaft 54 counter-clockwise, while the weight of the table top or plate 34 tend to rotate these members clockwise. These forces are related, by adjustment of the mass of the counter-balance, so that the operator can easily lower the plate 34 by means of the linkage shown. Normally the counterweight 76 will have sufficient mass to carry the parts and any load thereon to the elevated position. Latch means 75 operable through a push button 75' is used to hold the plate 34 in its lowermost position.

The support posts 78, four in number, are affixed to the outer frame members 12 and 14 at their bases and to the second grill plate 80 which is substantially the same as the grill plate 20 except that its grill surface is facing downward. The strip heaters for the grill plate 80, are illustrated at 82 and the insulation plate 84, of Marinite, covers the top of the strip heaters with a cover plate 86 thereover with rounded edges 88 to complete the assembly. One or more, or preferably four, stop members 90 made adjustable through engagement with a bore hole in the grill plate 80, and locked into position by the lock nuts 92 are provided at positions wherein they will contact, simultaneously, the corners of the reciprocatable table top 34. The top surface 96 of the table top 34 is lower than the top surface 98 of the grill plate 20, by about ⅛ to ¹⁄₁₆ of an inch when the former is in the lowered or downward position, as shown in FIG. 4, and held by the latch 75. In this position the surface 96 at the other side of the plate 34 is slightly above the surface 99 of the side frame member 12.

The electrical system for the grill plates 20 and 80 is conventional and not a part of this invention, with only the resistances 100 being generally represented therein, along with the capillary bulbs 102 for the thermostatic control. The thermostat 104 for the upper grill plate 80 is shown conveniently located on the top center of the cover plate 86. The thermostat 106 to control the lower grill plate 20 is located on the front panel 62. These controls may be any type designed to maintain the grill temperatures within the range of about 350° to 420° F. and at any given setting to maintain the temperature within about 5.0° F. The temperature for muffins is generally about 390° to 410° F. Thermostats of the type known as Chromalax Type AR are entirely satisfactory for this purpose, and are equipped with pilot lights to indicate "ON" and "OFF" positions.

The grilling device of this invention utilizes one or more conventional ring assemblies 110 (FIG. 1) comprising a plurality of cylindrical open ended rings 112 each adapted to receive a ball of muffin dough 115 or the like. The ring assemblies can comprise any number of rings 112 such as the 4 x 6 configuration shown, the rings being welded together at their circumferential points of contact, as indicated at 116 in FIG. 5. The rings are all substantially the same size and height and are welded together as a unit so that their bottom and top edges are coplanar. Any number of ring assemblies 110 can be used.

The table 10 has a pair of transverse bottom frame members 118 at the front and rear and side frame members 120, tied together by a pair of center posts 122 which support the panels 124 and define a proofing cabinet having a plurality of drawer-trays 125 (see also FIG. 6). The trays have a handle member 126 affixed to the front wall 128 by suitable brackets and side walls 130 jointed by means of a flat bottom 132 having a beveled edge 134. A series of apertures 136 are provided along the edges of the trays 125 and the entire top surface of the bottom 132 has a Teflon coating 138 thereover. The top trays 140 are similarly constructed, without the apertures 136 and are for the purpose of catching crumbs, such as cornmeal, that may be used in conjunction with the grilling or toasting process taking place on the grill 20.

The bottom tray 125' has a humidifier 142 with a suitable source of water and heat to supply warm moist air for the proofing cabinet. As shown in FIG. 1, the trays 125 are slidably supported on the longitudinal bars 144 so that the apertures 136 are in open communication from tray to tray throughout the cabinet. The trays 125 are dimensioned so that a ring holder 110 of the largest size contemplated to be used will fit thereon as shown in FIG. 5 and be readily removed therefrom by sliding the ring holder in the direction of the arrow 145 in FIG. 5, in relation to the tray. This is facilitated by the Teflon surface 138 which prevents the dough balls from sticking t othe trays. Also the wall 114 of each ring is lower than the wall 128 of the trays so that the trays with the ring holder thereon, filled with the dough balls 115 can be placed in the humidity cabinet and subsequently removed after proofing without the dough balls touching anything but the ring holder and the Teflon surface 138.

As shown in FIG. 1 the grill plate 20 is large enough to receive a ring holder 110 so that all of the dough balls 115 have their bottom surfaces against the heated surface. Means are provided to position the ring holder squarely on the grill plate 20, in the form of the stop bar 148 affixed to the hinges 150 so that it can be swung upwardly and out of the way for cleaning etc. The stop bar 148 extends inwardly far enough on the grill plate 20 so that the ring holder 110 is centered or will pass between the supports 78 of the grill plate 80.

The device of this invention is provided with a push bar 152 which extends the length of the table 10 and is supported in spaced relationship above the grill plate 20 by means of Thompson bearing 154 at the front end riding on the bar 156 held by means of the support brackets 158 and 160 to the front frame member 14. The Thompson bearing 154 is of the type having a spiral groove with ball bearings riding therein to give a free sliding movement. The handle 162 is affixed to the Thompson bearing to facilitate movement of the push bar 152 laterally along the bar 156. A pair of adjustable stop members 164 and 166, having set screws or Allen screws 168 are provided in sliding relationship on the bar 156. The back end of the push bar 152 is carried by the roller 170, riding on the rod 172 carried between the brackets 174 on the backside of the table 10. This structure assures that the bar 152 can be readily moved back and forth on the rods 156 and 172 without binding.

A receiving shelf 180 is provided at the exit end of the grill of this invention having a plurality of spaced longitudinal rollers 182 supported between the end members 184 and affixed to the table 10 by means of bracket 186 and brace 188. The shelf 180 is wide enough to receive a ring holder 110 and has a raised edge 190 which acts as a stop member for the ring holders as they roll thereon. To facilitate this action, the shelf 180 slopes downwardly from the level of the plate 34 and the first roller is lower than the surface 99 of the frame member 12.

The operation of the device of this invention is as follows: The unit is connected to a source of electrical power and the thermostats 104 and 106 set at the desired temperatures for toasting and cooking an item like muffins. The humidifier 142 starts to produce warm moist air in the cabinet 124. Dough of the desired formulation is formed into balls and continuously placed in a series of ring holders 110 each supported on a tray 125. This can be done on a separate work table which can be located adjacent the proofing cabinet 124. Six such filled trays are placed in the cabinet 124 in any sequence beginning from top to bottom or bottom to top. When the first tray in has reached the end of the proofing cycle about 30 minutes it is removed and the edge 134 placed upon the grill 20. The ring assembly with the proofed dough balls therein in transferred from the tray onto the grill 20, for a 5 minute grilling cycle on the bottom side. Another tray of the unproofed dough balls in a ring assembly is placed in the cabinet to replace the one just removed. At the end of 5 minutes the first batch of muffins have been grilled on their bottom sides. The push bar 152 is then moved across the grill 20 against the side of the ring assembly whereby it is moved between the supports 78 onto the plate 34, and the latch 75 is released to allow the plate 34 to rise to bring the top surfaces of the dough balls into contact with the grill plate 80 for a 5 minutes grilling cycle. The second tray in the cabinet 124 is then removed, the ring assembly and proofed dough balls is deposited on the grill 20 and it starts its 5 minute grill cycle on the bottom side. A fresh tray of unproofed dough balls held in a ring assembly is then placed in the second compartment of the cabinet. The ends of the 5 minute grill cycles on the grill 80 will occur slightly before that of the grill 20. This allows the operator to lower the plate 34 from its raised position, by turning the hand wheel 60 clockwise, to allow the latch 75 to hold the plate in the lowered position. The push bar 152 is moved across the grill plate 20, which action pushes the ring assembly thereon against the ring holder on the plate 34, pushing the latter onto the receiving shelf 180, for removal and separation of the muffins therefrom. These steps are repeated continuously for as long as desired to prepare the product in the quantities needed to meet the demand.

What is claimed is:
1. A grilling apparatus comprising:
  (a) a first grill member having an upwardly facing heating surface;
  (b) a plate member adjacent said first grill member;
  (c) a second grill member mounted above said plate member and having a downwardly facing heating surface spaced from the surface of said plate member; and
  (d) means to reciprocate one of said plate member and said second grill member toward and away from the other.

2. A grilling apparatus in accordance with claim 1 in which:
  (a) said first grill member and said plate member have plane substantially horizontal surfaces; and
  (b) the elevation of the plane surface of said first grill member is above the elevation of said plate member.

3. A grill apparatus in accordance with claim 2 including:
  (a) a product receiving shelf adjacent said plate member having a surface below the surface of said plate member; the surface of said shelf sloping downwardly away from said plate member; and
  (b) roller means comprising the product receiving surface said shelf.

4. A grill apparatus in accordance with claim 1 in which:
  (a) said means to reciprocate one of said plate member and said second grill member relative to the other comprises a supporting rod member centrally affixed to said plate member;
  (b) means are provided for reciprocatably supporting said rod member on a vertical axis;
  (c) a crank member is linked to the end of said rod member;
  (d) a counter balance on said crank member off-sets the weight of said plate member; and
  (e) means is provided to turn said crank member to raise said plate member to a position opposed to said second grill member.

5. A grill apparatus in accordance with claim 4 in which:
  (a) said counter balance is heavier than said plate member; and
  (b) latch means are provided to hold said plate member in the lowered position.

6. A grilling apparatus according to claim 1 wherein said plate member is below the heating surface of said first grill member and the apparatus includes:
  (a) a plurality of open-ended former rings secured together in a unitary coplanar assembly slidably disposed on the surface of said first grill member, and
  (b) a pusher bar mounted for movement across said first grill member for engaging and slidably shifting said assembly of former rings from the first grill member onto said plate member.

7. A combination muffin grill and dough proofer comprising:
  (a) a table having an open topped framework and front and back sides;
  (b) a first grill plate supported in a horizontal position on said framework and having an upwardly facing flat heating surface;
  (c) a flat plate member supported on said framework in a horizontal side-by-side relation with said first grill plate with its upper surface normally at an elevation below the upper surface of the first grill plate;
  (d) a second grill plate supported on said table above and in vertically spaced relation with said plate member and having a downwardly facing heating surface substantially parallel with said plate member; and
  (e) means for selectively raising and lowering said plate member.

8. A combination muffin grill and dough proofer according to claim 7 wherein the means for selectively raising and lowering the plate member includes a counterbalance normally urging the plate member upwardly toward the second grill plate, and a latch member is provided for releasably holding said plate member in its lowered position.

9. A grilling apparatus in accordance with claim 7 in which said table has an enclosed compartment and the apparatus includes;
  (a) a tray adapted to slide into said compartment, said tray having enclosed sides and an open end;
  (b) multiple ring means having individual retainers for dough portions, the top and bottom ends of said retainers being planar and the retainers being integrated to form a unitary assembly thereof adapted to fit within said tray and to be slidably shifted over the open end thereof onto the first grill plate;
  (c) a stop member on said first grill plate adapted to engage said multiple ring means upon its being shifted from said tray for alignment of the ring means for movement onto the plate member at the end of the toasting cycle to said plate member.

10. A combination muffin grill and dough proofing cabinet comprising;
  (a) a table member having an open topped framework having front and back sides;
  (b) a first grill plate supported in a horizontal position on said framework and presenting an upwardly facing flat heating surface;
  (c) a pair of guide rods extending along said front and back sides said framework at opposite ends of said first grill plate;
  (d) a push bar mounted between said guide rods and spaced above the said flat heating surface, said push bar being adapted to be moved laterally across said first grill plate between said sides;
  (e) a dough proofing cabinet in said framework, and having longitudinal tray support members therein arranged as a plurality of vertically spaced tiers;
  (f) a plurality of trays adapted to fit within said cabinet and be slidably supported one above the other by said support members;
  (g) said trays having front and side walls and an open rear end;
  (h) multiple ring retainer means for balled portions of muffin dough, said retainer means having individual walled retainers with their top and bottom edges in parallel planar relationship and adapted to be contained on said trays within said cabinet;
  (i) a source of warm humid air in said cabinet;
  (j) means communicating between said source of warm humid air and said trays;
  (k) a means for centering one of said retainer means on said first grill plate upon sliding transfer of the retainer means from one of said trays;
  (l) a plate member supported in a horizontal position on said framework in side by side relation with said first grill plate and having an upwardly facing flat surface normally at an elevation below said first grill plate;
  (m) a second grill plate supported in vertically aligned relationship above said plate member and having a downwardly facing heating surface substantially parallel to said plate member;
  (n) means for shifting said push bar across the first grill plate to push retainer means thereon onto the surface of said plate member; and
  (o) means for selectively raising and lowering said plate member.

11. A combination muffin grill and dough proofing cabinet in accordance with claim 10 including:
  (a) a receiving platform adjacent said plate member at the side thereof opposite said first grill plate and having longitudinal rollers mounted on coplanar axes between the front and back sides of said framework to comprise the receiving surface of the platform; and
  (b) the plane of said axes sloping downwardly away from said plate member and said platform being adapted to receive said ring retainers upon their being slidably shifted laterally from said plate member.

References Cited

UNITED STATES PATENTS

| 2,265,421 | 12/1941 | Donnelly | 99—423 XR |
| 2,696,162 | 12/1954 | Michaelis et al. | 99—425 |
| 2,812,415 | 11/1957 | Markowitz | 99—339 XR |

FOREIGN PATENTS

| 1,423,691 | 11/1965 | France. |
| 482,588 | 3/1938 | Great Britain. |
| 69,506 | 5/1947 | Norway. |

BILLY J. WILHITE, Primary Examiner

U.S. Cl. X.R.

99—357, 423, 425; 219—385